(12) United States Patent
Naik et al.

(10) Patent No.: US 8,379,830 B1
(45) Date of Patent: Feb. 19, 2013

(54) SYSTEM AND METHOD FOR AUTOMATED CUSTOMER SERVICE WITH CONTINGENT LIVE INTERACTION

(75) Inventors: Jayant M. Naik, Mason, OH (US); Coy Cordell, Villa Hills, KY (US); Dale Robert Peterson, Fort Thomas, KY (US); Joseph DiFonzo, Sanford, FL (US); Stephen D. Weagraff, Winter Park, FL (US); Matthew Yuschik, Andover, MA (US); Michael Louis Nutter, Cincinnati, OH (US); Robert Birch, Orlando, FL (US); Scot Cunningham, Osgood, IN (US); Woosung Kim, Mason, OH (US); Scott A. Irwin, Winter Springs, FL (US)

(73) Assignee: Convergys Customer Management Delaware LLC, Cincinnati, OH (US)

(*) Notice: Subject to any disclaimer, the term of this patent is extended or adjusted under 35 U.S.C. 154(b) by 1355 days.

(21) Appl. No.: 11/751,976

(22) Filed: May 22, 2007

Related U.S. Application Data

(63) Continuation-in-part of application No. 11/686,812, filed on Mar. 15, 2007.

(60) Provisional application No. 60/747,896, filed on May 22, 2006, provisional application No. 60/908,044, filed on Mar. 26, 2007.

(51) Int. Cl.
*H04M 3/00* (2006.01)
*H04M 5/00* (2006.01)
(52) U.S. Cl. .............. 379/265.02; 379/265.03
(58) Field of Classification Search .......... 704/251, 704/1, 9, 206, 257, 231, 255, 256, 240, 250; 379/265, 266, 221.06, 258; 370/352, 353, 370/354, 355, 356, 357; 705/14
See application file for complete search history.

(56) References Cited

U.S. PATENT DOCUMENTS

| | | | |
|---|---|---|---|
| 5,206,903 A | 4/1993 | Kohler et al. | |
| 5,214,715 A | 5/1993 | Carpenter et al. | |
| 5,345,380 A | 9/1994 | Babson, III et al. | |
| 5,411,947 A | 5/1995 | Hostetler et al. | |
| 5,488,652 A * | 1/1996 | Bielby et al. ............ | 379/88.03 |
| 5,570,419 A | 10/1996 | Cave et al. | |
| 5,581,664 A | 12/1996 | Allen et al. | |
| 5,586,218 A | 12/1996 | Allen | |
| 5,615,296 A | 3/1997 | Stanford et al. | |
| 5,625,748 A | 4/1997 | McDonough et al. | |
| 5,652,897 A | 7/1997 | Linebarger et al. | |
| 5,678,002 A | 10/1997 | Fawcett et al. | |
| 5,701,399 A | 12/1997 | Lee et al. | |
| 5,748,711 A | 5/1998 | Scherer | |
| 5,757,904 A | 5/1998 | Anderson | |

(Continued)

FOREIGN PATENT DOCUMENTS

| CA | 2248897 | 9/1997 |
|---|---|---|
| CA | 2301664 | 1/1999 |

(Continued)

OTHER PUBLICATIONS

Acl.ldc.upenn.edu/W/W99/W99-0306.pdf (visited on Aug. 22, 2007).

(Continued)

*Primary Examiner* — Ahmad Matar
*Assistant Examiner* — Kharye Pope
(74) *Attorney, Agent, or Firm* — Frost Brown Todd LLC (57) ABSTRACT

A balance between customer satisfaction and cost to providing customer care can be achieved based on the use of online interaction classification techniques. Such techniques can use measurements such as a log likelihood ratio to determine if an interaction should be removed from automation.

19 Claims, 4 Drawing Sheets

U.S. PATENT DOCUMENTS

| | | |
|---|---|---|
| 5,802,526 A | 9/1998 | Fawcett et al. |
| 5,802,536 A | 9/1998 | Yoshii |
| 5,825,869 A | 10/1998 | Brooks et al. |
| 5,852,814 A | 12/1998 | Allen |
| 5,867,562 A | 2/1999 | Scherer |
| 5,872,833 A | 2/1999 | Scherer |
| 5,895,466 A | 4/1999 | Goldberg et al. |
| 5,944,839 A | 8/1999 | Isenberg |
| 5,956,683 A | 9/1999 | Jacobs et al. |
| 5,960,399 A | 9/1999 | Barclay et al. |
| 5,963,940 A | 10/1999 | Liddy et al. |
| 5,966,429 A | 10/1999 | Scherer |
| 5,987,415 A | 11/1999 | Breese et al. |
| 5,991,394 A | 11/1999 | Dezonno |
| 6,021,403 A | 2/2000 | Horvitz et al. |
| 6,029,099 A | 2/2000 | Brown |
| 6,038,544 A | 3/2000 | Machin et al. |
| 6,044,142 A | 3/2000 | Hammarstrom et al. |
| 6,044,146 A | 3/2000 | Gisby et al. |
| 6,070,142 A | 5/2000 | McDonough et al. |
| 6,094,673 A | 7/2000 | Dilip et al. |
| 6,122,632 A | 9/2000 | Botts et al. |
| 6,137,870 A | 10/2000 | Scherer |
| 6,173,266 B1 | 1/2001 | Marx et al. |
| 6,173,279 B1 | 1/2001 | Levin et al. |
| 6,177,932 B1 | 1/2001 | Galdes et al. |
| 6,182,059 B1 | 1/2001 | Angotti |
| 6,188,751 B1 | 2/2001 | Scherer |
| 6,192,110 B1 | 2/2001 | Abella et al. |
| 6,205,207 B1 | 3/2001 | Scherer |
| 6,212,502 B1 | 4/2001 | Ball et al. |
| 6,233,547 B1 | 5/2001 | Denber |
| 6,233,570 B1 | 5/2001 | Horvitz et al. |
| 6,243,680 B1 | 6/2001 | Gupta et al. |
| 6,243,684 B1 | 6/2001 | Stuart et al. |
| 6,249,807 B1 | 6/2001 | Shaw et al. |
| 6,249,809 B1 | 6/2001 | Bro |
| 6,253,173 B1 | 6/2001 | Ma |
| 6,256,620 B1 | 7/2001 | Jawaher et al. |
| 6,260,035 B1 | 7/2001 | Horvitz et al. |
| 6,262,730 B1 | 7/2001 | Horvitz et al. |
| 6,263,066 B1 | 7/2001 | Shtivelman et al. |
| 6,263,325 B1 | 7/2001 | Yoshida et al. |
| 6,275,806 B1 | 8/2001 | Pertrushin |
| 6,278,996 B1 | 8/2001 | Richardson et al. |
| 6,282,527 B1 | 8/2001 | Gounares et al. |
| 6,282,565 B1 | 8/2001 | Shaw et al. |
| 6,304,864 B1 | 10/2001 | Liddy et al. |
| 6,307,922 B1 | 10/2001 | Scherer |
| 6,330,554 B1 | 12/2001 | Altschuler |
| 6,337,906 B1 | 1/2002 | Bugash et al. |
| 6,343,116 B1 | 1/2002 | Quinton et al. |
| 6,356,633 B1 | 3/2002 | Armstrong |
| 6,356,869 B1 | 3/2002 | Chapados et al. |
| 6,366,127 B1 | 4/2002 | Friedman et al. |
| 6,370,526 B1 | 4/2002 | Agrawal et al. |
| 6,377,944 B1 | 4/2002 | Busey et al. |
| 6,381,640 B1 | 4/2002 | Beck et al. |
| 6,389,124 B1 | 5/2002 | Schnarel et al. |
| 6,393,428 B1 | 5/2002 | Miller et al. |
| 6,401,061 B1 | 6/2002 | Zieman |
| 6,405,185 B1 | 6/2002 | Pechanek et al. |
| 6,411,692 B1 | 6/2002 | Scherer |
| 6,411,926 B1 | 6/2002 | Chang |
| 6,411,947 B1 | 6/2002 | Rice et al. |
| 6,415,290 B1 | 7/2002 | Botts et al. |
| 6,434,230 B1 | 8/2002 | Gabriel |
| 6,434,550 B1 | 8/2002 | Warner et al. |
| 6,442,519 B1 | 8/2002 | Kanevsky et al. |
| 6,449,356 B1 | 9/2002 | Dezonno |
| 6,449,588 B1 | 9/2002 | Bowman-Amuah |
| 6,449,646 B1 | 9/2002 | Sikora et al. |
| 6,451,187 B1 | 9/2002 | Suzuki et al. |
| 6,460,037 B1 | 10/2002 | Weiss et al. |
| 6,480,599 B1 | 11/2002 | Ainslee et al. |
| 6,493,686 B1 | 12/2002 | Francone et al. |
| 6,498,921 B1 | 12/2002 | Ho et al. |
| 6,519,571 B1 | 2/2003 | Guheen et al. |
| 6,519,580 B1 | 2/2003 | Johnson et al. |
| 6,519,628 B1 | 2/2003 | Locascio |
| 6,523,021 B1 | 2/2003 | Monberg et al. |
| 6,539,419 B2 | 3/2003 | Beck et al. |
| 6,546,087 B2 | 4/2003 | Shaffer et al. |
| 6,560,590 B1 | 5/2003 | Shwe et al. |
| 6,563,921 B1 | 5/2003 | Williams et al. |
| 6,567,805 B1 | 5/2003 | Johnson et al. |
| 6,571,225 B1 | 5/2003 | Oles et al. |
| 6,574,599 B1 | 6/2003 | Lim et al. |
| 6,581,048 B1 | 6/2003 | Werbos |
| 6,584,180 B2 | 6/2003 | Nemoto |
| 6,584,185 B1 | 6/2003 | Nixon |
| 6,587,558 B2 | 7/2003 | Lo |
| 6,594,684 B1 | 7/2003 | Hodjat et al. |
| 6,598,039 B1 | 7/2003 | Livowsky |
| 6,604,141 B1 | 8/2003 | Ventura |
| 6,606,479 B2 | 8/2003 | Cook et al. |
| 6,606,598 B1 | 8/2003 | Holthouse et al. |
| 6,614,885 B2 | 9/2003 | Polcyn |
| 6,615,172 B1 | 9/2003 | Bennett et al. |
| 6,618,725 B1 | 9/2003 | Fukuda et al. |
| 6,632,249 B2 | 10/2003 | Pollock |
| 6,633,846 B1 | 10/2003 | Bennett et al. |
| 6,643,622 B2 | 11/2003 | Stuart et al. |
| 6,650,748 B1 | 11/2003 | Edwards et al. |
| 6,652,283 B1 | 11/2003 | Van Schaack et al. |
| 6,658,598 B1 | 12/2003 | Sullivan |
| 6,665,395 B1 | 12/2003 | Busey et al. |
| 6,665,640 B1 | 12/2003 | Bennett et al. |
| 6,665,644 B1 | 12/2003 | Kanevsky et al. |
| 6,665,655 B1 | 12/2003 | Warner et al. |
| 6,694,314 B1 | 2/2004 | Sullivan et al. |
| 6,694,482 B1 | 2/2004 | Arellano et al. |
| 6,701,311 B2 | 3/2004 | Biebesheimer et al. |
| 6,704,410 B1 | 3/2004 | McFarlane et al. |
| 6,707,906 B1 | 3/2004 | Ben-Chanoch |
| 6,718,313 B1 | 4/2004 | Lent et al. |
| 6,721,416 B1 | 4/2004 | Farrell |
| 6,724,887 B1 | 4/2004 | Eilbacher et al. |
| 6,725,209 B1 | 4/2004 | Iliff |
| 6,732,188 B1 | 5/2004 | Flockhart et al. |
| 6,735,572 B2 | 5/2004 | Landesmann |
| 6,741,698 B1 | 5/2004 | Jensen |
| 6,741,699 B1 | 5/2004 | Flockhart et al. |
| 6,741,959 B1 | 5/2004 | Kaiser |
| 6,741,974 B1 | 5/2004 | Harrison et al. |
| 6,745,172 B1 | 6/2004 | Mancisidor et al. |
| 6,754,334 B2 | 6/2004 | Williams et al. |
| 6,760,272 B2 | 7/2004 | Franz et al. |
| 6,760,727 B1 | 7/2004 | Schroeder et al. |
| 6,766,011 B1 | 7/2004 | Fromm |
| 6,766,320 B1 | 7/2004 | Wang et al. |
| 6,771,746 B2 | 8/2004 | Shambaugh et al. |
| 6,771,765 B1 | 8/2004 | Crowther et al. |
| 6,772,190 B2 | 8/2004 | Hodjat et al. |
| 6,775,378 B1 | 8/2004 | Villena et al. |
| 6,778,660 B2 | 8/2004 | Fromm |
| 6,778,951 B1 | 8/2004 | Contractor |
| 6,795,530 B1 | 9/2004 | Gilbert et al. |
| 6,798,876 B1 | 9/2004 | Bala |
| 6,801,763 B2 | 10/2004 | Elsey et al. |
| 6,807,274 B2 | 10/2004 | Joseph et al. |
| 6,807,544 B1 | 10/2004 | Morimoto et al. |
| 6,813,606 B2 | 11/2004 | Ueyama et al. |
| 6,819,748 B2 | 11/2004 | Weiss et al. |
| 6,819,759 B1 | 11/2004 | Khue et al. |
| 6,823,054 B1 | 11/2004 | Suhm et al. |
| 6,829,348 B1 | 12/2004 | Schroeder et al. |
| 6,829,585 B1 | 12/2004 | Grewal et al. |
| 6,829,603 B1 | 12/2004 | Chai et al. |
| 6,832,263 B2 | 12/2004 | Polizzi et al. |
| 6,836,540 B2 | 12/2004 | Falcone et al. |
| 6,839,671 B2 | 1/2005 | Attwater et al. |
| 6,842,737 B1 | 1/2005 | Stiles et al. |
| 6,842,748 B1 | 1/2005 | Warner et al. |
| 6,842,877 B2 | 1/2005 | Robarts et al. |
| 6,845,154 B1 | 1/2005 | Cave et al. |
| 6,845,155 B2 | 1/2005 | Elsey |

| | | |
|---|---|---|
| 6,845,374 B1 | 1/2005 | Oliver et al. |
| 6,847,715 B1 | 1/2005 | Swartz |
| 6,850,612 B2 | 2/2005 | Johnson et al. |
| 6,850,923 B1 | 2/2005 | Nakisa et al. |
| 6,850,949 B2 | 2/2005 | Warner et al. |
| 6,856,680 B2 | 2/2005 | Mengshoel et al. |
| 6,859,529 B2 | 2/2005 | Duncan et al. |
| 6,871,174 B1 | 3/2005 | Dolan et al. |
| 6,871,213 B1 | 3/2005 | Graham et al. |
| 6,873,990 B2 | 3/2005 | Oblinger |
| 6,879,685 B1 | 4/2005 | Peterson et al. |
| 6,879,967 B1 | 4/2005 | Stork |
| 6,882,723 B1 | 4/2005 | Peterson et al. |
| 6,885,734 B1 | 4/2005 | Eberle et al. |
| 6,895,558 B1 | 5/2005 | Loveland |
| 6,898,277 B1 | 5/2005 | Meteer et al. |
| 6,901,397 B1 | 5/2005 | Moldenhauer et al. |
| 6,904,143 B1 | 6/2005 | Peterson et al. |
| 6,907,119 B2 | 6/2005 | Case et al. |
| 6,910,003 B1 | 6/2005 | Arnold et al. |
| 6,910,072 B2 | 6/2005 | MacLeod Beck et al. |
| 6,915,246 B2 | 7/2005 | Gusler et al. |
| 6,915,270 B1 | 7/2005 | Young et al. |
| 6,922,466 B1 | 7/2005 | Peterson et al. |
| 6,922,689 B2 | 7/2005 | Shtivelman |
| 6,924,828 B1 | 8/2005 | Hirsch |
| 6,925,452 B1 | 8/2005 | Hellerstein et al. |
| 6,928,156 B2 | 8/2005 | Book et al. |
| 6,931,119 B2 | 8/2005 | Michelson et al. |
| 6,931,434 B1 | 8/2005 | Donoho et al. |
| 6,934,381 B1 | 8/2005 | Klein et al. |
| 6,934,684 B2 | 8/2005 | Alpdemir et al. |
| 6,937,705 B1 | 8/2005 | Godfrey et al. |
| 6,938,000 B2 | 8/2005 | Joseph et al. |
| 6,941,266 B1 | 9/2005 | Gorin et al. |
| 6,941,304 B2 | 9/2005 | Gainey |
| 6,944,592 B1 | 9/2005 | Pickering |
| 6,950,505 B2 | 9/2005 | Longman et al. |
| 6,950,827 B2 | 9/2005 | Jung |
| 6,952,470 B1 | 10/2005 | Tioe et al. |
| 6,956,941 B1 | 10/2005 | Duncan et al. |
| 6,959,080 B2 | 10/2005 | Dezonno et al. |
| 6,959,081 B2 | 10/2005 | Brown et al. |
| 6,961,720 B1 | 11/2005 | Nelken |
| 6,965,865 B2 | 11/2005 | Plez |
| 6,967,316 B2 | 11/2005 | Lee |
| 6,970,554 B1 | 11/2005 | Peterson et al. |
| 6,970,821 B1 | 11/2005 | Shambaugh et al. |
| 6,975,708 B1 | 12/2005 | Scherer |
| 6,976,019 B2 | 12/2005 | Davallou |
| 6,981,020 B2 | 12/2005 | Miloslavsky et al. |
| 6,983,239 B1 | 1/2006 | Epstein |
| 6,985,862 B2 | 1/2006 | Strom et al. |
| 6,987,846 B1 | 1/2006 | James |
| 6,988,072 B2 | 1/2006 | Horvitz |
| 6,988,132 B2 | 1/2006 | Horvitz |
| 6,990,179 B2 | 1/2006 | Merrow et al. |
| 6,993,475 B1 | 1/2006 | McConnell et al. |
| 6,996,531 B2 | 2/2006 | Korall et al. |
| 6,999,990 B1 | 2/2006 | Sullivan et al. |
| 7,003,079 B1 | 2/2006 | McCarthy et al. |
| 7,003,459 B1 | 2/2006 | Gorin et al. |
| 7,006,607 B2 | 2/2006 | Garcia |
| 7,007,067 B1 | 2/2006 | Azvine et al. |
| 7,012,996 B2 | 3/2006 | Polcyn |
| 7,013,290 B2 | 3/2006 | Ananian |
| 7,016,056 B2 | 3/2006 | Skaanning |
| 7,016,485 B2 | 3/2006 | Shtivelman |
| 7,016,842 B2 | 3/2006 | Mills |
| 7,019,749 B2 | 3/2006 | Guo et al. |
| 7,027,586 B2 | 4/2006 | Bushey et al. |
| 7,031,951 B2 | 4/2006 | Mancisidor et al. |
| 7,035,384 B1 | 4/2006 | Scherer |
| 7,035,388 B2 | 4/2006 | Kurosaki |
| 7,039,165 B1 | 5/2006 | Saylor et al. |
| 7,039,166 B1 | 5/2006 | Peterson et al. |
| 7,045,181 B2 | 5/2006 | Yoshizawa et al. |
| 7,046,777 B2 | 5/2006 | Colson et al. |
| 7,047,498 B2 | 5/2006 | Lui et al. |
| 7,050,568 B2 | 5/2006 | Brown et al. |
| 7,050,976 B1 | 5/2006 | Packingham |
| 7,050,977 B1 | 5/2006 | Bennett |
| 7,058,169 B2 | 6/2006 | Sumner et al. |
| 7,058,565 B2 | 6/2006 | Gusler et al. |
| 7,065,188 B1 | 6/2006 | Mei et al. |
| 7,065,202 B2 | 6/2006 | Statham et al. |
| 7,068,774 B1 | 6/2006 | Judkins et al. |
| 7,072,643 B2 | 7/2006 | Pines et al. |
| 7,076,032 B1 | 7/2006 | Pirasteh et al. |
| 7,076,051 B2 | 7/2006 | Brown et al. |
| 7,076,427 B2 | 7/2006 | Scarano et al. |
| 7,076,736 B2 | 7/2006 | Hugh |
| 7,080,323 B2 | 7/2006 | Knott et al. |
| 7,085,367 B1 | 8/2006 | Lang |
| 7,085,755 B2 | 8/2006 | Bluhm et al. |
| 7,092,509 B1 | 8/2006 | Mears et al. |
| 7,092,510 B2 | 8/2006 | Hamilton, II et al. |
| 7,092,888 B1 * | 8/2006 | McCarthy et al. ............ 704/277 |
| 7,096,219 B1 | 8/2006 | Karch |
| 7,099,855 B1 | 8/2006 | Nelken et al. |
| 7,103,170 B2 | 9/2006 | Fain et al. |
| 7,103,172 B2 | 9/2006 | Brown et al. |
| 7,103,553 B2 | 9/2006 | Applebaum et al. |
| 7,103,562 B2 | 9/2006 | Kosiba et al. |
| 7,106,850 B2 | 9/2006 | Campbell et al. |
| 7,107,207 B2 | 9/2006 | Goodman |
| 7,107,254 B1 | 9/2006 | Dumais et al. |
| 7,110,523 B2 | 9/2006 | Gagle et al. |
| 7,110,524 B2 | 9/2006 | Rupe et al. |
| 7,110,525 B1 | 9/2006 | Heller et al. |
| 7,117,158 B2 | 10/2006 | Weldon et al. |
| 7,117,188 B2 | 10/2006 | Guyon et al. |
| 7,133,866 B2 | 11/2006 | Rishel et al. |
| 7,134,672 B2 | 11/2006 | Beishline et al. |
| 7,136,851 B2 | 11/2006 | Ma et al. |
| 7,139,555 B2 | 11/2006 | Apfel |
| 7,152,029 B2 | 12/2006 | Alshawi et al. |
| 7,155,158 B1 | 12/2006 | Iuppa et al. |
| 7,158,935 B1 | 1/2007 | Gorin et al. |
| 7,171,352 B2 | 1/2007 | Chang et al. |
| 7,181,492 B2 | 2/2007 | Wen et al. |
| 7,194,359 B2 | 3/2007 | Duffy et al. |
| 7,200,675 B2 | 4/2007 | Wang et al. |
| 7,203,635 B2 | 4/2007 | Oliver et al. |
| 7,203,646 B2 | 4/2007 | Bennett |
| 7,209,908 B2 | 4/2007 | Li et al. |
| 7,210,135 B2 | 4/2007 | McCrady et al. |
| 7,213,742 B1 | 5/2007 | Birch et al. |
| 7,215,744 B2 | 5/2007 | Scherer |
| 7,219,085 B2 | 5/2007 | Buck et al. |
| 7,237,137 B2 | 6/2007 | Goeller et al. |
| 7,237,243 B2 | 6/2007 | Sutton et al. |
| 7,240,011 B2 | 7/2007 | Horvitz |
| 7,240,244 B2 | 7/2007 | Teegan et al. |
| 7,246,353 B2 | 7/2007 | Forin et al. |
| 7,249,135 B2 | 7/2007 | Ma et al. |
| 7,254,579 B2 | 8/2007 | Cabrera et al. |
| 7,254,641 B2 | 8/2007 | Broughton et al. |
| 7,257,203 B2 | 8/2007 | Quinton |
| 7,257,514 B2 | 8/2007 | Faihe |
| 7,269,516 B2 | 9/2007 | Brunner et al. |
| 7,275,048 B2 | 9/2007 | Bigus et al. |
| 7,283,621 B2 | 10/2007 | Quinton |
| 7,292,689 B2 | 11/2007 | Odinak et al. |
| 7,299,259 B2 | 11/2007 | Petrovykh |
| 7,305,345 B2 | 12/2007 | Bares et al. |
| 7,313,782 B2 | 12/2007 | Lurie et al. |
| 7,328,146 B1 * | 2/2008 | Alshawi et al. ................ 704/1 |
| 7,346,493 B2 | 3/2008 | Ringger et al. |
| 7,373,410 B2 | 5/2008 | Monza et al. |
| 7,382,773 B2 | 6/2008 | Schoeneberger et al. |
| 7,389,351 B2 | 6/2008 | Horvitz |
| 7,391,421 B2 | 6/2008 | Guo et al. |
| 7,394,393 B2 | 7/2008 | Zhang et al. |
| 7,395,540 B2 | 7/2008 | Rogers |
| 7,409,344 B2 | 8/2008 | Gurram et al. |
| 7,415,417 B2 | 8/2008 | Boyer et al. |
| 7,424,485 B2 | 9/2008 | Kristiansen et al. |

| | | | |
|---|---|---|---|
| 7,437,295 B2 | 10/2008 | Pitts, III et al. |
| 7,437,297 B2 | 10/2008 | Chaar et al. |
| 7,451,432 B2 | 11/2008 | Shukla et al. |
| 7,454,399 B2 | 11/2008 | Matichuk |
| 7,475,010 B2 | 1/2009 | Chao |
| 7,487,095 B2 | 2/2009 | Hill et al. |
| 7,493,300 B2 | 2/2009 | Palmer et al. |
| 7,505,756 B2 | 3/2009 | Bahl |
| 7,505,921 B1 | 3/2009 | Lukas et al. |
| 7,509,327 B2 | 3/2009 | Joshi et al. |
| 7,509,422 B2 | 3/2009 | Jaffray et al. |
| 7,519,564 B2 | 4/2009 | Horvitz |
| 7,519,566 B2 | 4/2009 | Priogin et al. |
| 7,523,220 B2 | 4/2009 | Tan et al. |
| 7,526,439 B2 | 4/2009 | Freishtat et al. |
| 7,526,474 B2 | 4/2009 | Ohkuma et al. |
| 7,529,774 B2 | 5/2009 | Lane et al. |
| 7,539,654 B2 | 5/2009 | Ramaswamy et al. |
| 7,539,656 B2 | 5/2009 | Fratkina et al. |
| 7,546,542 B2 | 6/2009 | Premchandran |
| 7,552,055 B2 | 6/2009 | Lecoeuche |
| 7,558,783 B2 | 7/2009 | Vadlamani et al. |
| 7,561,673 B2 | 7/2009 | Wang |
| 7,562,115 B2 | 7/2009 | Zircher et al. |
| 7,565,648 B2 | 7/2009 | Kline et al. |
| 7,567,967 B2 | 7/2009 | Chopra et al. |
| 7,574,358 B2 | 8/2009 | Deligne et al. |
| 7,599,861 B2 * | 10/2009 | Peterson | 705/26 |
| 7,606,714 B2 * | 10/2009 | Williams et al. | 704/275 |
| 7,613,722 B2 | 11/2009 | Horvitz et al. |
| 7,634,066 B2 | 12/2009 | Quinton |
| 7,634,077 B2 | 12/2009 | Owhadi et al. |
| 7,636,735 B2 | 12/2009 | Haas et al. |
| 7,643,995 B2 | 1/2010 | Acero et al. |
| 7,644,376 B2 | 1/2010 | Karachale et al. |
| 7,650,381 B2 | 1/2010 | Peters |
| 7,668,961 B2 | 2/2010 | Lomet |
| 7,681,186 B2 | 3/2010 | Chang et al. |
| 7,689,410 B2 | 3/2010 | Chang et al. |
| 7,689,521 B2 | 3/2010 | Nodelman et al. |
| 7,689,615 B2 | 3/2010 | Burges et al. |
| 7,694,022 B2 | 4/2010 | Garms et al. |
| 7,698,324 B2 | 4/2010 | Vries |
| 7,716,253 B2 | 5/2010 | Netz et al. |
| 7,739,208 B2 | 6/2010 | George et al. |
| 7,746,999 B2 | 6/2010 | Williams et al. |
| 7,774,292 B2 | 8/2010 | Brennan et al. |
| 7,797,403 B2 | 9/2010 | Vedula et al. |
| 7,831,679 B2 | 11/2010 | Apacible et al. |
| 7,831,688 B2 | 11/2010 | Linyard et al. |
| 7,856,321 B2 | 12/2010 | Lanza et al. |
| 7,856,601 B2 | 12/2010 | Moore et al. |
| 7,885,820 B1 | 2/2011 | Mancisidor et al. |
| 7,890,544 B2 | 2/2011 | Swartz et al. |
| 7,895,262 B2 | 2/2011 | Nielsen et al. |
| 7,941,492 B2 | 5/2011 | Pearson et al. |
| 7,949,787 B2 | 5/2011 | Box et al. |
| 7,953,219 B2 | 5/2011 | Freedman et al. |
| 7,984,021 B2 | 7/2011 | Bhide et al. |
| 7,995,735 B2 | 8/2011 | Vos et al. |
| 8,024,406 B1 | 9/2011 | Irwin et al. |
| 8,027,457 B1 | 9/2011 | Coy et al. |
| 8,068,247 B2 | 11/2011 | Wu |
| 8,073,699 B2 | 12/2011 | Michelini et al. |
| 8,096,809 B2 | 1/2012 | Burgin et al. |
| 8,112,383 B2 | 2/2012 | Acheson et al. |
| 8,126,722 B2 | 2/2012 | Robb et al. |
| 8,160,883 B2 | 4/2012 | Lecoeuche |
| 8,170,197 B2 | 5/2012 | Odinak |
| 8,185,399 B2 | 5/2012 | Di Fabbrizio et al. |
| 8,185,589 B2 | 5/2012 | Sundararajan et al. |
| 8,234,169 B2 | 7/2012 | Fraser |
| 8,266,586 B2 | 9/2012 | Wang |
| 2001/0044800 A1 | 11/2001 | Han |
| 2001/0047261 A1 | 11/2001 | Kassan |
| 2001/0047270 A1 | 11/2001 | Gusick et al. |
| 2001/0053977 A1 | 12/2001 | Schaefer |
| 2001/0054064 A1 | 12/2001 | Kannan |
| 2002/0013692 A1 | 1/2002 | Chandhok et al. |
| 2002/0026435 A1 | 2/2002 | Wyss et al. |
| 2002/0032549 A1 * | 3/2002 | Axelrod et al. | 703/2 |
| 2002/0032591 A1 | 3/2002 | Mahaffy et al. |
| 2002/0046096 A1 | 4/2002 | Srinivasan et al. |
| 2002/0062245 A1 | 5/2002 | Niu et al. |
| 2002/0072921 A1 | 6/2002 | Boland et al. |
| 2002/0087325 A1 | 7/2002 | Lee et al. |
| 2002/0095295 A1 * | 7/2002 | Cohen et al. | 704/275 |
| 2002/0104026 A1 | 8/2002 | Barra et al. |
| 2002/0123957 A1 | 9/2002 | Notarius et al. |
| 2002/0147848 A1 | 10/2002 | Burgin et al. |
| 2002/0161626 A1 | 10/2002 | Plante et al. |
| 2002/0178022 A1 | 11/2002 | Anderson et al. |
| 2003/0046297 A1 | 3/2003 | Mason |
| 2003/0046311 A1 | 3/2003 | Baidya et al. |
| 2003/0084066 A1 | 5/2003 | Waterman et al. |
| 2003/0120653 A1 | 6/2003 | Brady et al. |
| 2003/0169870 A1 | 9/2003 | Stanford |
| 2003/0200135 A1 | 10/2003 | Wright |
| 2003/0212654 A1 | 11/2003 | Harper et al. |
| 2004/0002502 A1 | 1/2004 | Banholzer et al. |
| 2004/0030556 A1 * | 2/2004 | Bennett | 704/270 |
| 2004/0054743 A1 * | 3/2004 | McPartlan et al. | 709/206 |
| 2004/0138944 A1 | 7/2004 | Whitacre et al. |
| 2004/0148154 A1 | 7/2004 | Acero et al. |
| 2004/0158480 A1 | 8/2004 | Lubars et al. |
| 2004/0162724 A1 | 8/2004 | Hill et al. |
| 2004/0162812 A1 | 8/2004 | Lane et al. |
| 2004/0176968 A1 | 9/2004 | Syed et al. |
| 2004/0210637 A1 | 10/2004 | Loveland |
| 2004/0220772 A1 | 11/2004 | Cobble et al. |
| 2004/0228470 A1 | 11/2004 | Williams et al. |
| 2004/0230689 A1 | 11/2004 | Loveland |
| 2004/0260534 A1 | 12/2004 | Seo et al. |
| 2004/0264677 A1 * | 12/2004 | Horvitz et al. | 379/265.02 |
| 2004/0268229 A1 | 12/2004 | Paoli et al. |
| 2005/0065789 A1 | 3/2005 | Yacoub et al. |
| 2005/0071178 A1 | 3/2005 | Beckstrom et al. |
| 2005/0084082 A1 | 4/2005 | Horvitz et al. |
| 2005/0091123 A1 | 4/2005 | Freishtat et al. |
| 2005/0091147 A1 | 4/2005 | Ingargiola et al. |
| 2005/0097028 A1 | 5/2005 | Watanabe et al. |
| 2005/0097197 A1 | 5/2005 | Vincent |
| 2005/0125229 A1 | 6/2005 | Kurzweil |
| 2005/0143628 A1 | 6/2005 | Dai et al. |
| 2005/0163302 A1 | 7/2005 | Mock et al. |
| 2005/0171932 A1 | 8/2005 | Nandhra |
| 2005/0177601 A1 | 8/2005 | Chopra et al. |
| 2005/0193102 A1 | 9/2005 | Horvitz |
| 2005/0195966 A1 | 9/2005 | Adar et al. |
| 2005/0203760 A1 | 9/2005 | Gottumukkala et al. |
| 2005/0228707 A1 | 10/2005 | Hendrickson |
| 2005/0228796 A1 | 10/2005 | Jung |
| 2005/0228803 A1 | 10/2005 | Farmer et al. |
| 2005/0246241 A1 | 11/2005 | Irizarry, Jr. et al. |
| 2005/0256819 A1 | 11/2005 | Tibbs et al. |
| 2005/0278124 A1 | 12/2005 | Duffy et al. |
| 2005/0278177 A1 | 12/2005 | Gottesman |
| 2005/0286688 A1 | 12/2005 | Scherer |
| 2005/0288981 A1 | 12/2005 | Elias |
| 2006/0015390 A1 | 1/2006 | Rijsinghani et al. |
| 2006/0041648 A1 | 2/2006 | Horvitz |
| 2006/0059431 A1 | 3/2006 | Pahud |
| 2006/0069564 A1 | 3/2006 | Allison et al. |
| 2006/0069570 A1 | 3/2006 | Allison et al. |
| 2006/0074831 A1 | 4/2006 | Hyder et al. |
| 2006/0080468 A1 | 4/2006 | Vadlamani et al. |
| 2006/0101077 A1 | 5/2006 | Warner et al. |
| 2006/0109974 A1 | 5/2006 | Paden et al. |
| 2006/0122834 A1 | 6/2006 | Bennett |
| 2006/0122917 A1 | 6/2006 | Lokuge et al. |
| 2006/0190226 A1 | 8/2006 | Jojic et al. |
| 2006/0190253 A1 | 8/2006 | Hakkani-Tur et al. |
| 2006/0195321 A1 * | 8/2006 | Deligne et al. | 704/257 |
| 2006/0198504 A1 | 9/2006 | Shemisa et al. |
| 2006/0206330 A1 | 9/2006 | Attwater et al. |
| 2006/0212446 A1 | 9/2006 | Hammond et al. |
| 2006/0235861 A1 | 10/2006 | Yamashita et al. |
| 2007/0033189 A1 | 2/2007 | Levy et al. |

| | | | |
|---|---|---|---|
| 2007/0121902 A1* | 5/2007 | Stoica et al. | 379/265.11 |
| 2008/0034354 A1 | 2/2008 | Brughton et al. | |
| 2009/0070113 A1* | 3/2009 | Gupta et al. | 704/257 |
| 2009/0254344 A1* | 10/2009 | Hakkani-Tur et al. | 704/251 |

FOREIGN PATENT DOCUMENTS

| | | |
|---|---|---|
| CA | 2485238 | 1/1999 |
| EP | 0077175 A2 | 4/1983 |
| EP | 0977175 B1 | 2/2000 |
| EP | 1191772 A2 | 3/2002 |
| EP | 1324534 A1 | 2/2003 |
| EP | 1424844 A1 | 6/2004 |
| EP | 1494499 A2 | 1/2005 |
| GB | 2343772 | 5/2000 |
| JP | 10133847 A | 5/1998 |
| JP | 2002055695 A | 2/2002 |
| JP | 2002189483 A | 7/2002 |
| JP | 2002366552 A | 12/2002 |
| JP | 2002374356 A | 12/2002 |
| JP | 2004030503 A | 1/2004 |
| JP | 2004104353 A | 4/2004 |
| JP | 2004118457 A | 4/2004 |
| JP | 2004220219 A | 8/2004 |
| JP | 2004241963 A | 8/2004 |
| JP | 2004304278 A | 10/2004 |
| JP | 2005258825 A | 9/2005 |
| WO | WO 92/15951 A1 | 9/1992 |
| WO | WO 93/21587 A2 | 10/1993 |
| WO | WO 94/28541 | 12/1994 |
| WO | WO 95/02221 A1 | 1/1995 |
| WO | WO 95/27360 | 10/1995 |
| WO | WO 99/04347 | 1/1999 |
| WO | WO 99/53676 A1 | 10/1999 |
| WO | WO 00/18100 | 3/2000 |
| WO | WO 00/70481 | 11/2000 |
| WO | WO 00/73955 A2 | 12/2000 |
| WO | WO 00/75851 | 12/2000 |
| WO | WO 01/04814 A1 | 1/2001 |
| WO | WO 01/33414 A2 | 5/2001 |
| WO | WO 01/35617 A2 | 5/2001 |
| WO | WO 01/37136 | 5/2001 |
| WO | WO 01/39028 | 5/2001 |
| WO | WO 01/39082 | 5/2001 |
| WO | WO 01/39086 | 5/2001 |
| WO | WO 01/82123 A1 | 11/2001 |
| WO | WO 02/09399 | 1/2002 |
| WO | WO 02/19603 | 3/2002 |
| WO | WO 02/27426 | 4/2002 |
| WO | WO 02/061730 A1 | 8/2002 |
| WO | WO 02/073331 A2 | 9/2002 |
| WO | WO 03/009175 A1 | 1/2003 |
| WO | WO 03/021377 | 3/2003 |
| WO | WO 03/069874 A2 | 8/2003 |
| WO | WO 2004/059805 A2 | 5/2004 |
| WO | WO 2004/081720 A2 | 9/2004 |
| WO | WO 2004/091184 | 10/2004 |
| WO | WO 2004/107094 | 12/2004 |
| WO | WO 2005/006116 A2 | 1/2005 |
| WO | WO 2005/011240 A1 | 2/2005 |
| WO | WO 2005/013094 A2 | 2/2005 |
| WO | WO 2005/069595 A1 | 7/2005 |
| WO | WO 2006/050503 A2 | 5/2006 |
| WO | WO 2006/062854 A2 | 6/2006 |
| WO | WO 2007/033300 A2 | 3/2007 |

OTHER PUBLICATIONS

Dingo.sbs.arizona.edu/~sandiway/ling538o/lecture1.pdf (visited on Aug. 22, 2007).
En.wikipedia.org/wiki/Microsoft_Agent (visited on Aug. 22, 2007).
en.wikipedia.org/wiki/Wizard_of_Oz_experiment (visited on Aug. 22, 2007).
Liveops.com/news/news_07-0116.html (visited on Aug. 22, 2007).
www.aumtechinc.com/CVCC/cvcc11.0.htm (visited on Aug. 22, 2007).
www.beamyourscreen.com/US/Welcome.aspx (visited Aug. 24, 2007).
www.bultreebank.org/SProLaC/paper05.pdf (visited on Aug. 22, 2007).
www.callcenterdemo.com (visited on Aug. 22, 2007).
www.changingcallcenters.com (visited on Aug. 22, 2007).
www.crm2day.com/news/crm/115147.php (visited on Aug. 22, 2007).
www.csdl2.computer.org/persagen/DLAbsToc (visied Sep. 13, 2007).
www.eff.org/patent (visited on Aug. 22, 2007).
www.eff.org/patent/wanted/patent.php?p=firepond (visited on Aug. 22, 2007).
www.egain.com (visited Aug. 24, 2007).
www.instantservice.com (visited Aug. 24, 2007).
www.kana.com (visited Aug. 24, 2007).
www.learn.serebra.com/trainingclasses/index (visited Sep. 13, 2007).
www.livecare.it/en/par_business (visited Aug. 24, 2007).
www.livehelper.com/products (visited Aug. 24, 2007).
www.liveperson.com/enterprise/proficient.asp (visited Aug. 24, 2007).
www.microsoft.com/serviceproviders/solutions/ccf.mspx (visited on Aug. 22, 2007).
www.oracle.com/siebel/index (visited Aug. 24, 2007).
www.pageshare.com (visited Aug. 24, 2007).
www.realmarket.com/news/firepond082703.html (visited on Aug. 22, 2007).
www.serebra.com/naa/index (visited Sep. 13, 2007).
www.speechcycle.com/about/management_team.asp (visited on Aug. 22, 2007).
www.spoken.com (visited on Aug. 22, 2007).
www.spoken.com/who/our_story.asp (visited on Aug. 22, 2007).
www.training-classes.com/course_hierarchy/courses/4322_call_center_structures_customer_relationships.php.
www.velaro.com (visited Aug. 24, 2007).
www.virtualhold.com (visited on Aug. 22, 2007).
www.volusion.com (visited Aug. 24, 2007).
www.vyew.com/content (visited Aug. 24, 2007).
www.webdialogs.com (visited Aug. 24, 2007).
www.webmeetpro.com/technology.asp (visited Aug. 24, 2007).
www.wired.com/news/business/0,64038-0.html (visited on Aug. 22, 2007).
Adams, Scott, Dilbert cartoon.
Alam, Hisham; *Stand and Deliver* (Industry Trend or Event) (Editorial), Intelligent Enterprise, Mar. 27, 2001, pp. 44, vol. 4, No. 5, CMP Media, Inc., USA. (Abstract only reviewed and provided.).
Avaya. *Advanced Multichannel Contact Management Avaya Interaction Center White Paper*. Apr. 2005.
Bernstel, J.B., *Speak right up!* Ybank call centers, ABA Bank Marketing, Nov. 2001, pp. 16-21, vol. 33, No. 9, American Bankers Assoc., USA. (Abstract only reviewed and provided.).
Burbach, Stacey; Niedenthal, Ashley; *Siebel Leverages Telephony@Work Technology as Part of Siebel CRM OnDemand Release 7*; Siebel Incorporates Telephony@Work Technology in CRM OnDemand Release 7, Jun. 6, 2005, ProQuest, Chicago, IL. (Abstract only reviewed and provided.).
Caruso, Jeff; *Standards Committee to Define Call Center Terms* (industry Reporting Standards Steering Committee) (Technology Information), CommunicationsWeek, Apr. 29, 1996, 1(2) pp., No. 608, USA. (Abstract only reviewed and provided.).
Chan, C.; Chen, Liqiang; Chen, Lin-Li; *Development of an Intelligent Case-Based System for Help Desk Operations*, May 9-12, 1999, pp. 1062-1067, vol. 2, Electrical and Computer Engineering, 1999 IEEE Canadian Conference on, Edmonton, Alta., Canada. (Abstract only reviewed and provided.).
Chiu, Dickson K.W.; Chan, Wesley C.W.; Lam, Gary K.W.; Cheung, S.C.; and Luk, Franklin T., *An Event Driven Approach to Customer Relationship Management in E-Brokerage Industry*, Jan. 2003, 36th Annual Hawaii International Conference on System Sciences, USA. (Abstract only reviewed and provided.).
Choudhary, Alok; Dubey, Pradeep; Liao, Wei-Keng; Liu, Ying; Memik, Gokhan; Pisharath, Jayaprakash; *Performance Evaluation and Characterization of Scalable Data Mining Algorithms*, 2004, pp. 620-625, vol. 16, Proc. IASTED Int. Conf. Parall. Distrib. Comput. Syst., USA.

Finke, M.; Lapata, M.; Lavie, A.; Levin, L.; Tomokiyo, L.M.; Polzin, T.; Ries, K.; Waibel, A.; Zechner, K.; Clarity: *Inferring Discourse Structure from Speech*, Mar. 23-25, 1998, pp. 25-32, Proceedings of 1998 Spring Symposium Series Applying Machine Learning to Discourse Processing, USA. (Abstract only reviewed and provided.).

Fowler, Dennis. *The Personal Touch—How E-Businesses Are Using Customer Relations Management to Thwart Competitors and Bolster Their Bottom Lines*. Dec. 2000.

Gao, Jianfeng; Microsoft Research Asia and Chin-Yew Lin, Information Sciences Institute, Univ. of S. California, *Introduction to the Special Issue on Statistical Language Modeling*, ACM Transactions on Asian Language Information Processing, vol. 3, No. 2, Jun. 2004, pp. 87-93.

Getting Better Every Day: *How Marrying Customer Relationship Marketing to Continuous Improvement Brings Sustained Growth*, Aug. 2005, pp. 24-25, vol. 21, No. 8, Strategic Direction, USA. (Abstract only reviewed and provided.).

Gupta, Narendra; Gokhan Tur, Dilek Hakkani-Tür, *Member, IEEE*, Srinivas Bangalore, Giuseppe Riccardi, *Senior Member; IEEE*, and Mazin Gilbert, *Senior Member, IEEE. The AT&T Spoken Language Understanding System. IEEE Transaction on Audio, Speech, and Language Processing*. vol. 14, No. 1, Jan. 2006.

Hu, Xunlei Rose, and Eric Atwell. *A survey of machine learning approaches to analysis of large corpora*. School of Computing, University of Leeds, U.K. LS2 9JT.

IBM TDB, #7 Business Method to Improve Problem Diagnosis in Current Systems Using a Combination of XML and VoiceXML, Jan. 1, 2002, IPCOM000014964D, USA.

Iyer, A.V.; Deshpande, V.; Zhengping, Wu; *A Postponement Model for Demand Management*, Aug. 2003, pp. 983-1002, vol. 49, No. 8, Management Science, USA. (Abstract only reviewed and provided.).

Karahan, Mercan; Dilek Hakkani-Tür, Giuseppe Riccardi, Gokhan Tur. *Combining Classifiers for Spoken Language Understanding*. © 2003 IEEE.

Langkilde, Irene; Marilyn Walker; Jerry Wright, Allen Gorin, Diane Litman. *Automatic Prediction of Problematic Human-Computer Dialogues in 'How May I Help You?'* AT&T Labs—Research.

Lewis, Michael, Research note: *A Dynamic Programming Approach to Customer Relationship Pricing*, Jun. 2005, pp. 986-994, vol. 51, No. 6, Management Science, USA. (Abstract only reviewed and provided.).

Lindsay, Jeff; Schuh, James; Reade, Walter; Peterson, Karin; Mc Kinney, Christopher. *The Historic Use of Computerized Tools for Marketing and Market Research: A Brief Survey*, Dec. 27, 2001, www.ip.com, USA. (Abstract only reviewed and provided.).

Litman, Diane J. and Shimei Pan. *Designing and Evaluating an Adaptive Spoken Dialogue System*. © 2002 Kluwer Academic Publishers.

Loren Struck, Dennis. *Business Rule Continuous Requirement Environment. A Dissertation Submitted to the Graduate Council in Partial Fulfillment of the Reqirement for the Degree of Doctor of Computer Science*. Colorado Springs, Colorado, May 1999.

Marsico, K., *Call Centers: Today's New Profit Centers*, 1995-1996, pp. 14-18, vol. 10, No. 4, AT&T Technology, USA. (Abstract only reviewed and provided.).

Mohri, Mehryar; Fernando Pereira, Michael Riley. *Weighted Finite-State Transducers in Speech Recognition*. Article submitted to *Computer Speech and Language*.

Paek, Tim & Eric Horvitz. *Optimizing Automated Call Routing by Integrating Spoken Dialog Models with Queuing Models*. (timpaek/horvitz@Microsoft.com) Microsoft, Redmond, WA.

Peng, Fuchun and Dale Schuurmans. *Combining Naïve Bayes and n-Gram Language Models for Text Classification*. (f3peng, dale@cs.uwaterloo.ca).

Pradhan, Sameer S.; Ward, Wayne H.; *Estimating Semantic Confidence for Spoken Dialogue Systems*, 2002, pp. 233-236, ICASSP, IEEE International Conference on Acoustics, Speech and Signal Processing—Proceedings v 1, USA. (Abstract only reviewed and provided.).

Riccardi, G.; Gorin, A.L.; Ljolje, A.; Riley, M.; *A Spoken Language System for Automated Call Routing*, Apr. 21, 1997, pp. 1143-1146, International Conference on Acoustics, Speech and Signal Processing, USA. (Abstract only reviewed and provided.).

Ritter, Julie, *Crossroads Custumer Solutions Expands Siebel Contact OnDemand Deployment with Siebel CRM OnDemand*, Apr. 12, 2004, ProQuest, Chicago, IL. (Abstract only reviewed and provided.).

Schapire, Robert E., and Yoram Singer. *BoosTexter: A Boosting-based System for Text Categorization*. (schapire@research.att.com; singer@research.att.com).

Schmidt, M.S., *Identifying Speakers with Support Vector Networks*, Jul. 8-12, 1996, pp. 305-314, Proceedings of 28$^{th}$ Symposium on the Interface of Computing Science and Statistics (Graph-Image-Vision.), USA. (Abstract only reviewed and provided.).

Seiya and Masaru (Toshiba), #3 Knowledge Management Improvement of Help Desk Operation by Q & A Case Referencing, Toshiba Rebya, 2001, vol. 56, No. 5, pp. 28-31.

Shriberg, E.; Bates, R.; Stolcke, A.; Taylor, P.; Jurafsky, D.; Ries, K.; Coccaro, N.; Martin, R.; Mateer, M.; Vaness-Dykema, C.; *Can Prosody Aid the Automatic Classification of Dialog Acts in Conversational Speech?*, 1988, pp. 443-492, vol. 41, Language and Speech, USA. (abstract only reviewed and provided.).

*SSA Global Strengthens CRM Functionality for Customers' Inbound and Outbound Marketing Initiatives*; SSA Marketing 7.0 introduces major enhancements to the company's industry-leading marketing automation solution, Apr. 3, 2006, ProQuest, Chicago, IL. (Abstract only reviewed and provided.).

Steinborn, D. *Time flies, even wating* (bank telephone answering), Bank Systems + Technology, Sep. 1993, pp. 39, 41, vol. 30, No. 9, La Salle Nat. Bank, Chicago, IL. (Abstract only reviewed and provided.).

Stolcke, A.; Ries, K.; Coccaro, N.; Shriberg, E.; Bates, R.; Jurafsky, D.; Taylor, P.; Martin, R.; Van Ess-Dykema, C.; Meteer, M.; *Dialogue Act Modeling for Automatic Tagging and Recognition of Conversational Speech*, Sep. 2000, pp. 339-373, vol. 26, No. 3, Computational Linguistics, USA. (abstract only reviewed and provided.).

Suhm, Bernhard and Pat Peterson. Received May 29, 2001. *Data-Driven Methodology for Evaluating and Optimizing call Center IVRs*. Revised Aug. 22, 2001. (bsuhm@bbn.com; patp@bbn.com).

Tang, Min; Bryan Pellom, Kadri Hacioglu. *Call-Type Classification and Unsupervised Training for the Call Center Domain*. (tagm,pellom,hacioglu@cslr.colorado.edu).

Thiel, Beth Miller; Weber, Porter Novelli Kimberly; PeopleSoft Announces *General Availability of PeopleSoft Enterprise* CRM 8.9 Services, Jun. 16, 2004, ProQuest, Chicago, IL. (Abstract only reviewed and provided.).

To use and abuse (Voice processing), What to Buy for Business, Jan. 1995, pp. 2-20, No. 166, UK. (Abstract only reviewed and provided.).

Wahlster, Wolfgang. *The Role of Natural Language in Advanced Knowledge-Based Systems*. In: H. Winter (ed.): Artificial Intelligence and Man-Machine Systems, Berlin: Springer.

Walker, Marilyn A.; Irene Langkilde-Geary, Helen Wright Hastie, Jerry Wright, Allen Gorin. *Automatically Training a Problematic Dialogue Predictor for a Spoken Dialogue System*. © 2002 AI Access Foundation and Morgan Kaufmann Publishers, published May 2002.

Walker, Marilyn, *Learning to Predict Problematic Situations in a Spoken Dialogue System: Experiments with How May I Help You?*, 2000, pp. 210-217, ACM International Conference Proceeding Series; vol. 4 archive, Proceedings of the first conference on North American Chapter of the Association for Computational Linguistics, Seattle, WA. (Abstract only reviewed and provided.).

Whittaker, Scahill, Attwater and Geenhow, Interactive Voice Technology for Telecommunications for Telecommuniactions Applications,: #10 Practical Issues in the application of speech technology to network and customer service applications, (1998) IVTTA '98 Proceedings, 1998 IEEE 4$^{th}$ Workshop, Published Sep. 1998, pp. 185-190. USA.

Yan, Lian; R.H. Wolniewica, R. Dodier. Abstract—*Predicting Customer Behavior in Telecommunications*. Intelligent Systems, IEEE Mar.-Apr. 2004.

Young, Alan; Innis, Rafael; *System and Method for Developing Business Process Policies*, Jul. 3, 2002, Patent Publication 2003005154, Computer Associates International, Inc., USA. (Abstract only reviewed and provided.).

Young, Howard; Adiano, Cynthia; Enand, Navin; Ernst, Martha; Thompson, Harvey; Zia, May Sun; *Customer Relationship Manage-*

*ment Business Method*, Jul. 5, 2005, Patent Application 723519, USA. (Abstract only reviewed and provided.).
Zweig, G.; O. Siohan, G. Saon, B. Ramabhadran, D. Povey, L. Mangu and B. Kingsbu. *Automated Quality Monitoring in the Call Center With ASR and Maximum Entropy.* IBM T.J. Watson Research Center, Yorktown Heights, NY 10598 (ICASSP 2006).
Alpaydin, Ethem; *Introduction to Machine Learning*, Abe Books.
Mitchell, Tom, *Machine Learning*, Abe Books.
Russell, Stuart J. and Peter Norvig, *Artificial Intelligence: A Modern Approach*, Abe Books.
Witten, Ian H., and Eibe Frank, *Data Mining: Practical Tools Machine Learning Tools and Techniques*, Abe Books.
Office Action dated Oct. 17, 2011 for U.S. Appl. No. 11/686,812.
U.S. Appl. No. 10/862,482, filed Jun. 7, 2004, Irwin, et al.
U.S. Appl. No. 10/044,848, filed Jan. 27, 2005, Irwin, et al.
U.S. Appl. No. 11/291,562, field Dec. 1, 2005, Shomo, et al.
U.S. Appl. No. 11/686,562, field Mar. 15, 2007, Irwin, et al.
U.S. Appl. No. 13/208,953, field Aug. 12, 2011, Coy, et al.

* cited by examiner

SYSTEM AND METHOD FOR AUTOMATED CUSTOMER SERVICE WITH CONTINGENT LIVE INTERACTION

PRIORITY

This non-provisional application claims priority from U.S. Provisional 60/747,896, SYSTEM AND METHOD FOR ASSISTED AUTOMATION, which was filed on May 22, 2006. It also claims priority from U.S. Provisional 60/908,044, SYSTEM AND METHOD FOR AUTOMATED CUSTOMER SERVICE WITH CONTINGENT LIVE INTERACTION, which was filed on Mar. 26, 2007. It also claims priority, as a continuation-in-part from U.S. application Ser. No. 11/686,812, SYSTEM AND METHOD FOR CUSTOMER VALUE REALIZATION, which was filed on Mar. 15, 2007. Each of these applications is hereby incorporated by reference.

BACKGROUND

Automating customer care through self-service solutions (e.g., Interactive Voice Response (IVR), web-based self-care, etc.) results in substantial cost savings and operational efficiencies. However, due to several factors, such automated systems are unable to provide customers with a quality experience. Such factors include the highly constrained nature of automated interactions, poor error recovery in automated interactions, and poor context handling in automated interactions. The present invention addresses some of the deficiencies experienced with presently existing automated care systems.

One challenge in providing automated customer service (e.g., through an interactive voice response system) is a tradeoff between cost and customer satisfaction. While customer interactions which take place using an automated system (e.g., an interactive voice response system) are generally less expensive than interactions which take place between a customer and a human being, automated interactions are also likely to lead to lower customer satisfaction. One technique for addressing this problem is to provide customer service wherein an interaction initially takes place between a customer and an automated system, and, if the interaction seems to be approaching a negative outcome (i.e., "going bad"), transferring the interaction from an automated to a live interaction. However, an obstacle to the successful use of this technique is the problem of determining when an interaction is "going bad." If an algorithm for determining when an interaction is "going bad" is oversensitive, then too few interactions will be completed using automation, resulting in unnecessary cost. If an algorithm for determining when an interaction is "going bad" is under-sensitive, then too few interactions will be transferred to a live interaction, resulting in lower customer satisfaction and, ultimately, a lost customer and lost business. Further, even creating an algorithm for determining whether an interaction is "going bad" can be a difficult task. The teachings of this application can be used to address some of these deficiencies in the state of the art for systems and methods used in customer interactions.

SUMMARY OF THE INVENTION

In an embodiment, there is a computerized method for determining when to transfer a user from an automated service to a live agent comprising (a) classifying a set of historical interactions offline; (b) after said classifying step, training a set of classification models using said set of classified historical interactions to perform real-time classification of an interaction; (c) after said training step, determining a log likelihood ratio, using said classification models, to trigger whether to transfer said user, from an automated interaction to a live interaction, by computing a log of a prediction that an interaction is good over a prediction that an interaction is bad.

For the purpose of clarity, certain terms used in this application should be understood to have particular specialized meanings. For example, a "set of computer executable instructions" should be understood to include any combination of one or more computer instructions regardless of how organized, whether into one or more modules, one or more programs, a distributed system or any other organization. Also, as used in this application, "computer memory" should be understood to include any device or medium, or combination of devices and media, which is capable of storing computer readable and/or executable instructions and/or data. As used in this application, the term "model" should be understood to refer to a representation or a pattern for a thing. One example of a "model" is a classification model, such as an n-gram language model, which acts as a pattern for certain types of customer interactions.

A "customer interaction" (also, an interaction) should be understood to refer to a communication or set of communications through which information is obtained by a customer. Examples of automated interactions include dialog interactions where a customer is presented with prompts, and then responds to those prompts, and web page interactions, where a customer obtains information by following hyperlinks and providing input (i.e., through forms) on a web page. A live interaction takes place with a human being. Additionally, the term "monitor," in the context of "monitoring the processing of a customer interaction" should be understood to refer to the act of observing, obtaining data about, or measuring the processing of the customer interaction.

An Interactive Voice Response (IVR) is an automated telephony system that interacts with callers, gathers information and routes calls to the appropriate recipient. An IVR system (IVR) accepts a combination of voice telephone input and touch-tone keypad selection and provides appropriate responses in the form of voice, fax, callback, e-mail and perhaps other media. An IVR system consists of telephony equipment, software applications, a database and a supporting infrastructure.

Classifying shall refer to arranging or organizing by classes or assigning a classification to information. Transferring shall refer to conveying or causing to pass from one place, person, or thing to another.

Interaction refers to an exchange between a user and either the automated system or a live agent. Training shall refer to coaching in or accustoming to a mode of behavior or performance; making proficient with specialized instruction and practice. A live agent generally refers to a human customer service representative.

A logarithm is an exponent used in mathematical calculations to depict the perceived levels of variable quantities. Suppose three real numbers a, x, and y are related according to the following equation: $x=a^y$. Then y is defined as the base-a logarithm of x. This is written as follows: $\log_a x = y$. As an example, consider the expression $100=10^2$. This is equivalent to saying that the base-10 logarithm of 100 is 2; that is, $\log_{10} 100=2$. Note also that $1000=10^3$; thus $\log_{10} 1000=3$. (With base-10 logarithms, the subscript 10 is often omitted, so we could write log 100=2 and log 1000=3). When the base-10 logarithm of a quantity increases by 1, the quantity itself increases by a factor of 10. A 10-to-1 change in the size of a quantity, resulting in a logarithmic increase or decrease of 1, is called an order of magnitude. Thus, 1000 is one order of magnitude larger than 100. In an embodiment the log likelihood ratio may be computed using the formula $\log(P(x|LM_{good})/P(x|LM_{bad}))$.

In an embodiment, the log likelihood ratio is compared against a threshold value to determine whether said interaction is bad. A threshold value is the point that must be exceeded to begin producing a given effect or result or to elicit a response.

In an embodiment, threshold value may be dynamically reset based on external factors. In computer terminology, dynamic usually means capable of action and/or change, while static means fixed. Both terms can be applied to a number of different types of things, such as programming languages (or components of programming languages), Web pages, and application programs. External factors refer to factors situated or being outside something; acting or coming from without (e.g., external influences). In an embodiment, an example of a dynamic factor may be how successful the dialog has been up to that point—if a caller has proffered a large number (appropriately determined by business rules) of inputs during that interaction and the system has successfully recognized and a 'dialog success' metric has been reached, then the caller might be immediately transferred to an agent with appropriate data and thereby shorten that subsequent agent interaction. If a caller has given few or no input and is in need of agent intervention, they may be transferred to a normal queue or escalated into a more verbose dialog.

In an embodiment, the threshold value may be dynamically reset based on a lifetime value associated with said user. For discussion of lifetime value, please see co-pending patent application U.S. application Ser. No. 11/686,812, SYSTEM AND METHOD FOR CUSTOMER VALUE REALIZATION, which was filed on Mar. 15, 2007 (and which is incorporated by reference into this application).

In an embodiment, the models are based on a boostexter classification. For a discussion of boostexter classification, please see "Boostexter: A boosting-based system for text categorization." By R. E. Schapire and Y. Singer appearing in Machine Learning, vol. 39, no 2/3, pp. 135-168, 2000; incorporated herein by reference.

In an embodiment, the boostexter classification is derived using Bayes' rule. Bayes' rule is a result in probability theory, which relates the conditional and marginal probability distributions of random variables. In some interpretations of probability, Bayes' theorem tells how to update or revise beliefs in light of new evidence a posteriori.

In an embodiment, the classification models are based on an N-gram based language model. An n-gram is a sub-sequence of n items from a given sequence. N-grams are used in various areas of statistical natural language processing and genetic sequence analysis. The items in question can be letters, words or base pairs according to the application. N-grams constitute a novel approach to developing classification models because there is some "dependence" or "memory" associated with present and past dialog states that has an immediate impact on the success of the current dialog. Dialogs may be designed based on a higher-level knowledge of the interaction and the business logic and processes that drive them and the recognition that there dependence on prior states exists (e.g., if you are ready to pay with a credit card, then it is reasonable to assume that you have gone through several dialog states such as login, product selection, etc.). Also, the deeper the dialog (and the longer the call, in general), the more dependence there is between present and prior dialog states. N-grams can allow the classification models to predict dialog success/failure more reliably.

In an embodiment, the log likelihood ratio is re-calculated for each turn in said interaction. A turn refers to a single exchange within an interaction between a user and the automated system and/or the live agent. This allows detection rather than mere prediction of when a call is going bad. Furthermore, this allows detection to be performed at any point during the call (after any number of turn exchanges).

In an embodiment computer-executable instructions encoded on a computer-readable medium for determining when to transfer a user from an automated service to a live agent comprising a) predicting whether an interaction is good, based on a classification model, using $P(x|LM_{good})$; b) predicting whether an interaction is bad, based on a classification model, using $P(x|LM_{bad})$; c) calculating a log likelihood ratio using $\log(P(x|LM_{good})/P(x|LM_{bad}))$; d) setting a threshold value for said log likelihood ratio; e) if said log likelihood ratio falls below said threshold value, executing instructions to transfer said user from automation to said live agent. Calculating refers to making a computation or forming an estimate. Setting refers to assigning a value to a variable.

In an embodiment, said classification model is based on a boostexter classification. The boostexter classification may be derived using Bayes' rule. The classification model may also be based on an N-gram-based language model. In an embodiment the threshold value may be dynamically modified based on external factors. In an embodiment the threshold value may be dynamically reset based on a lifetime value associated with said user. In an embodiment, the computer-executable instructions recalculate the log likelihood ratio for each turn in said interaction.

In an embodiment, a computerized system for determining when to transfer a user from an automated service to a live agent comprises a) an interactive voice response system (IVR) and b) a monitoring module. The user interacts with said IVR. The monitoring module evaluates, after each turn in said IVR, a probability that said user's interaction with the IVR is good and a probability that said user's interaction with the IVR is bad. The monitoring module signals an alarm to bring in a human agent if a log of the ratio of said probabilities is below a predetermined threshold. A monitoring module is a computer with instructions encoded thereon to receive data regarding an interaction and calculate the probabilities associated therewith. An alarm may comprise computer-executable instructions to take a particular action. In an embodiment, the monitoring module evaluates said probabilities based on an N-gram based language model built on partial inputs. Partial inputs may comprise any subsection of an interaction. In an embodiment, the monitoring module evaluates said probabilities based on a boostexter classifier in an iterative algorithm. In an embodiment, the threshold may be dynamically reset based on a lifetime value associated with said user.

DETAILED DESCRIPTION

Some embodiments might make use of transaction information and use it to learn, which might be accomplished with the help of machine learning software agents. This might allow the automated self-care system to improve its performance in the area of user interface, speech, language and classification models, application logic, and/or other areas relevant to customer and/or agent interactions.

For ease of comprehension, this application is structured in the following manner. First, the application describes techniques for offline classification of interactions. Second, the application discusses how data regarding interactions classified offline can be used to train models used for online classification. Third, the application will describe how those models can be used to detect when an interaction should be transferred from an automated interaction to a live interaction (e.g., when the interaction is "going bad"). To make concrete examples possible, the discussion below will be set forth in the context of interactive voice response system technology. However, upon reviewing this application, one of ordinary skill in the art will be able to apply the teachings of this application in contexts and for uses beyond those explicitly set forth herein including a variety of modalities (e.g., web-based interactions). Thus, this application should be understood as illustrative only, and not limiting on any claims included in patent applications which claim the benefit of this application.

To facilitate the discussion of offline classification of interactions, the following assumptions should be made. First, it should be assumed that there is provided a corpus of data representing interactions which can be classified. Such a data corpus can be generated during the normal operation of an interactive voice response system, as most such systems are designed to automatically monitor calls, and create records of calls for quality assurance purposes. Second, it should be assumed that the records in the data corpus representing individual interactions preserve all information regarding the interaction. Examples of such information include prompts provided by the interactive voice response system, transcriptions of statements by a caller derived from an automatic speech recognizer, meanings ascribed to statements made by the caller, confidence scores for the transcriptions and/or meanings, and other relevant information which can be used to represent or describe an interaction. Of course, it should be understood that these assumptions are made for the sake of clarity only, and that they are not intended to be limiting on the scope of any claims included in applications claiming the benefit of this disclosure.

Figures 3A, 3B:
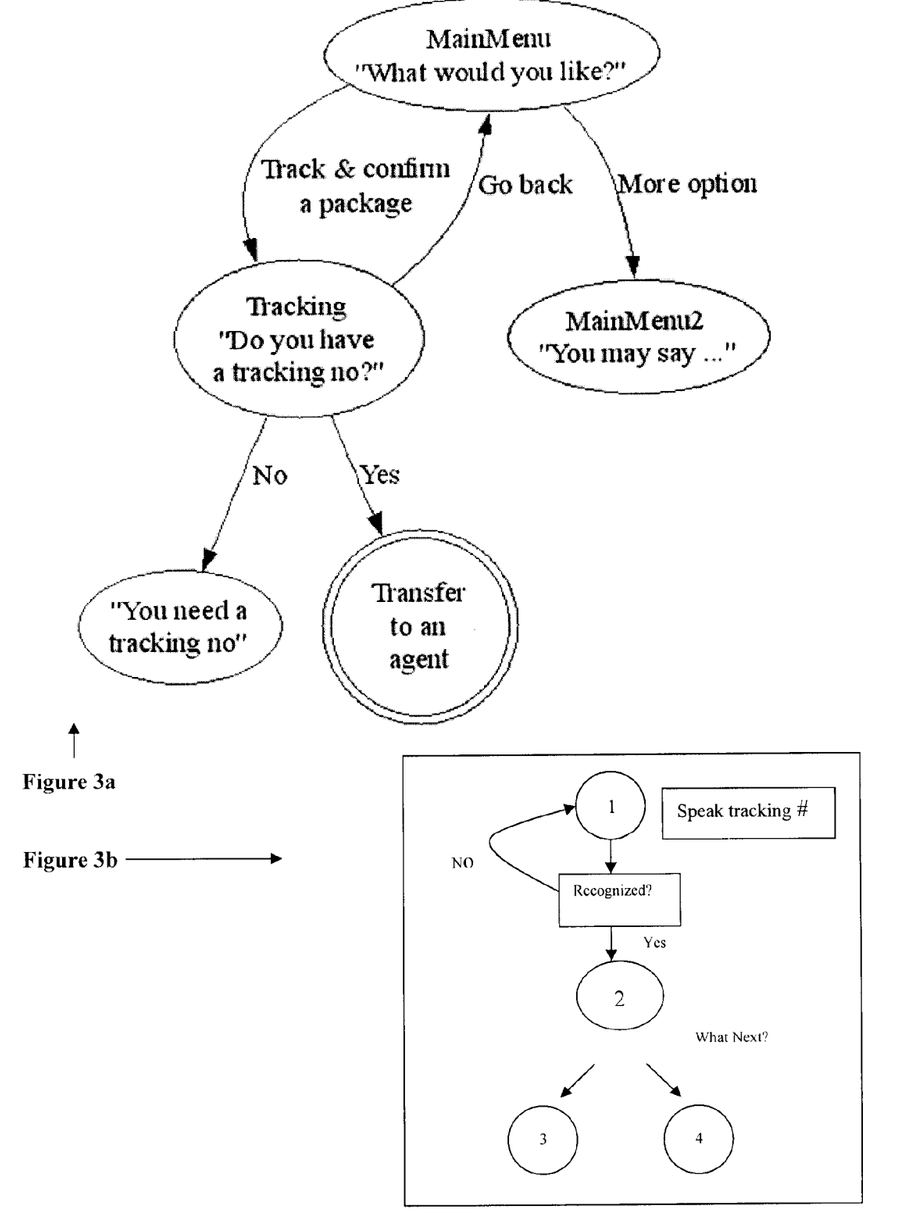
FIGS. 3a-b depict a representation of a call flow for an interactive voice response system in the form of a state machine.

Agent assisted support may be triggered by a variety of mechanisms including, but not limited to, dialog quality or a specific call path. In some embodiments, a voice dialog (or some other type of interaction, such as a self care web site) might be defined in terms of specific states and transition between states. Referring to FIG. 3b, an IVR application that automates tracking and shipping of a package may contain a number of states.

Given such a data corpus, the step of offline classification of interactions can be performed using a variety of techniques. For example, a live individual could review the records of individual interactions and classify the interactions "by hand." Alternatively, a live individual could classify some of the interactions, and then those interactions could be used as training data for an automated system (e.g., a neural network) which would classify the remaining interactions. As another alternative, rules or logic functions could be developed and used to classify the interactions (e.g., IF a caller hung up THEN classify the interaction as "bad" ELSE classify the interaction as "good"). As yet another alternative, a finite state machine such as is depicted in FIG. 3 could be made based on the call flow for the interactive voice response system. Using this technique, calls which are accepted by the finite state machine (for example, because the call flow reaches a desired "final" state) can be classified as "good," while calls which are not accepted by the finite state machine (for example, because no "final" state is reached due to caller disconnection or due to network or server problem, or because an undesirable "final" state, such as the caller opting out of automation is reached) could be classified as "bad." Of course, it is also possible that combined methods of classification could be used. For example, classification could be based on a finite state machine, but additionally, calls which exhibit some identifiable characteristics (e.g., repeated "yes/no" confirmations, which generally happen only when an automatic speech recognizer is unsure of a transcription of customer speech) could also be classified as "bad." Additional combinations, variations and alternative techniques could also be used in classification. Thus, the discussion above should be understood as illustrative only, and not limiting on the scope of any claims in applications claiming the benefit of this disclosure.

A state-transition model may be used to illustrate certain methods of tracking dialog quality which might be used in some embodiments. As will be known to one of ordinary skill in the art, tracking dialog quality as discussed below, is not limited to embodiments which utilize the state-transition model. One method which some embodiments might use to measure dialog quality comprises rules. For example, a transition from state 1 to state 2 might have a set of rules such as: no more than two loopbacks from state 2 to state 1, and no more than 10 seconds time should be spent in state 1 (e.g., the system might time out if the caller does not speak or takes too long to respond).

In a rule-based dialog quality system, the relevant dialog events might be logged and sent to a dialog quality monitor for each call. A set of decision rules might then be applied to those events and a dialog quality rating might be generated by the decision agent. This decision can be produced for every state transition. Such a rule generated dialog quality rating might then be used to measure the quality of a customer interaction.

Another type of method which some embodiments might use to measure dialog quality comprises an analysis of probabilities. In some such probability analysis methods, each state might have a probability associated with it, which might be based on the likelihood of a caller reaching that state. The transitions between states might also have probabilities associated with them (or such probabilities associated with transitions might be the only probabilities measured). In some probability based methods, the probabilities might be trained based on heuristics and/or data from real deployments of the application. In some probability based dialog quality models, with every transition, an overall probability measure might be determined. Such a measure might be defined as how likely a particular dialog flow is in relation to the general population or to a target user group, though other types of probability measures, such as a measure of how likely a particular transition was relative to the general population or a particular user group might also be utilized. Regardless, once a probability measure has been made, one way to use such measure to determine dialog quality is to compare the probability measure to values corresponding to dialog quality states. For example, probability measures between 0 and 30% might be defined as poor dialog quality, probability measures between 31 and 70% might be defined as acceptable dialog quality, while probability measures between 71 and 99% might be defined as good dialog quality.

In some embodiments, if the probability measurement falls too low, or if it indicates a high probability of a negative outcome from the interaction, some action might be taken, such as automatically transferring the interaction to an agent. When a caller is transferred to an agent, they might have access to the dialog quality measure and a description of how it was arrived at, i.e., what caused the interaction to deteriorate.

In some embodiments, specific events associated with a dialog can be obtained by mining call logs from existing or new applications in real-time to generate events of interest. One approach which might be taken is to list the desired events in a configuration file that the IVR application can use to generate events in real-time.

It should be noted that, while the assumption that the records in the data corpus preserve all information regarding the interaction could allow for a high degree of flexibility in techniques used in offline classification, such complete data preservation is not necessary for all offline classification. For example, when classification is performed using a finite state machine, the classification could be based on some subset of the information stored for the interactions (e.g., the meanings assigned to statements by the caller), while the remaining information (e.g., confidence in transcriptions of caller statements) could be discarded, or could be maintained for some other purpose. Similarly, using a logic function in offline classification, it is possible to only use a subset of the information regarding individual interactions in the logic functions, while the remaining information could be discarded, or could be maintained for some other purpose. Thus, in some implementations, it is possible that offline classification could be performed even if some subset of information regarding an interaction is not preserved in the records of the data corpus. Additional variations on this approach could be implemented by those of ordinary skill in the art without undue experimentation. Therefore, it should be understood that the variations presented herein are intended to be illustrative only, and not limiting on the scope of any claims included in applications claiming the benefit of this disclosure.

After the offline classification has taken place, the classified interaction data can be used to train models which can be used to perform classification in an online manner. As was the case with the offline classification, a variety of techniques can be used for the training of models. For example, it is possible that the classified models can be used to train models such as N-gram based language models, or that the records could be used to train iterative models, such as the boostexter classification models described in R. E. Shapire and Y. Singer, "Boostexter: A boosting-based system for text categorization." Machine Learning, vol. 39, no. 2/3, pp. 135-168, 2000, the teachings of which are hereby incorporated by reference. Thus, concretely, in an example in which the records were classified as "good" or "bad" using a finite state machine based on the meanings of responses given by a caller, a class conditional language model $LM_c$ can be built by taking the caller's response sequence as a word sequence. Using this technique, a prior, given test input x consisting of response sequences ($x=r_1, r_2, \ldots r_n$) can be classified by estimating the likelihood of the sequence from each $LM_c$:

$$\hat{c} = \underset{c \in C}{\operatorname{argmax}} P(x \mid LM_c)$$

where C={good, bad}.

Similarly, using a Boostexter classifier on an input x of responses as described above, the confidence that x is in a class c can be determined by using the following formula:

$$P(c|x) = (1 + \exp(-2 * f(x)))^{-1}$$

where $$f(x) = \sum_{t=1}^{T} \alpha_t h_t(x),$$

$h_t(x)$ is a base classifier at t, and $\alpha_t$ is its weight, as in M. Karahan, D. Hakkani-Tür, G. Riccardi, and G. Tur, "Combining classifiers for spoken language understanding" Proc. of ASRU, Virgin Islands, USA, November 2003, pp. 589-594, the teachings of which are hereby incorporated by reference in their entirety.

Of course, additional variations could be implemented by those of ordinary skill in the art without undue experimentation in light of this disclosure. For example, while it is possible that models could be trained based on complete series' of responses from a caller (i.e., for an interaction in which the caller made n responses, the input x would be ($r_1, r_2, \ldots r_n$), it is also possible to use partial sequences, in order to more closely approximate online classification during training. This could be accomplished by chopping the individual records into turns, then feed turn sequence prefixes (up to each particular turn) to the classifier being trained. Still further variations could also be implemented. Thus, the discussion herein of training models for online classification should be understood as being illustrative only, and not limiting.

Once a model for online classification has been trained, that model can actually be used to determine whether to transfer a call from an automated interaction to a live interaction. As was the case with the steps of offline interaction classification and model training described above, a variety of techniques can be used in this step as well. For example, it is possible that a classification model could be used directly to predict whether an interaction is "good" and therefore should continue in automation or "bad" and therefore should be transferred to a live individual (e.g., using a language model as described above, the interaction could be transferred to a live individual if $P(x|LM_{good})$ falls below a set threshold, or if $P(x|LM_{bad})$ rises above a set threshold).

Alternatively, it is also possible that models such as described above could be used as inputs to other functions which could be used for determining whether an interaction should be transferred. For example, a log likelihood ratio (LLR) could be used based on the good/bad classification (e.g., using a language model as described previously, the measurement $\log(P(x|LM_{good})/P(x|LM_{bad}))$ to determine whether to transfer an interaction out of automation). Other variations, such as a log likelihood ratio for a Boostexter classifier derived using Bayes' rule could be used as well. In any case, the function or models could then be applied to actual interactions, and, in real time, determine whether an interaction should be transferred out of automation, thereby increasing customer satisfaction, by transferring interactions before they "go bad," and at the same time reducing costs, by avoiding unnecessary transfers. A good call never hits the threshold. The LLR is compared against the threshold value to determine when to bring in a human agent. The use of logs allows an easier and more accurate determination of the best threshold value because taking log dynamically scales particular numbers within certain ranges. The invention achieves this by taking the log of the prediction that a call is good over the prediction that a call is bad. By taking the log of the ratio of each of the probabilities, the system more accurately distinguishes between a single bad turn triggering a live operator (particularly if it would be possible for the IVR to recover from the error), and when the system is not able to recover (e.g., by a continuous series of really bad turns). The log operation helps by providing a uniform 'range' of values to work with in determining the optimal thresholds across a large number of turns and variations.

Figure 1:
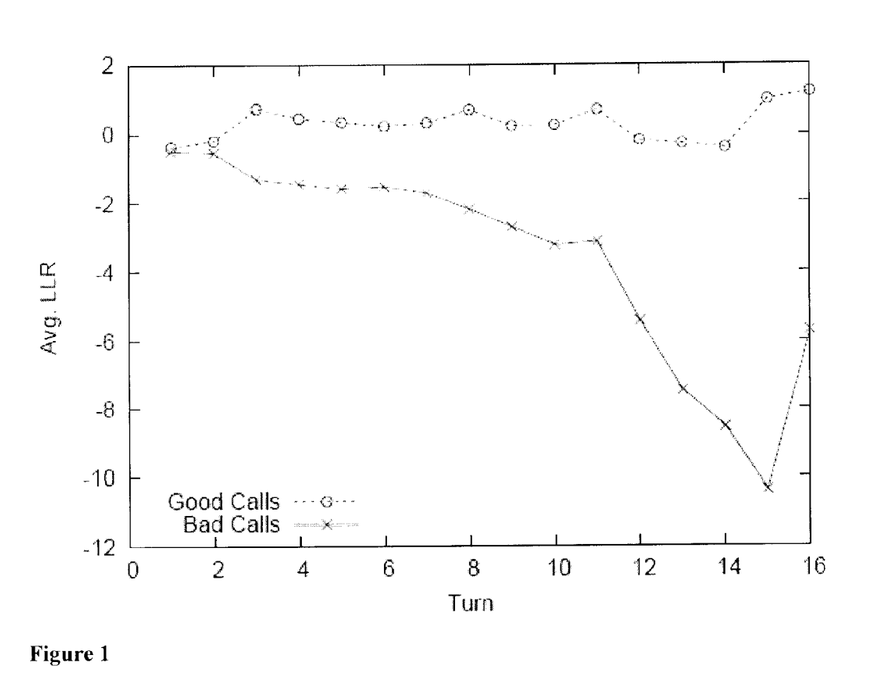
FIG. 1 depicts an experimentally observed relationship between a log likelihood ratio and turn progression for "good" and "bad" interactions between a caller and an interactive voice response system.
Figure 2:
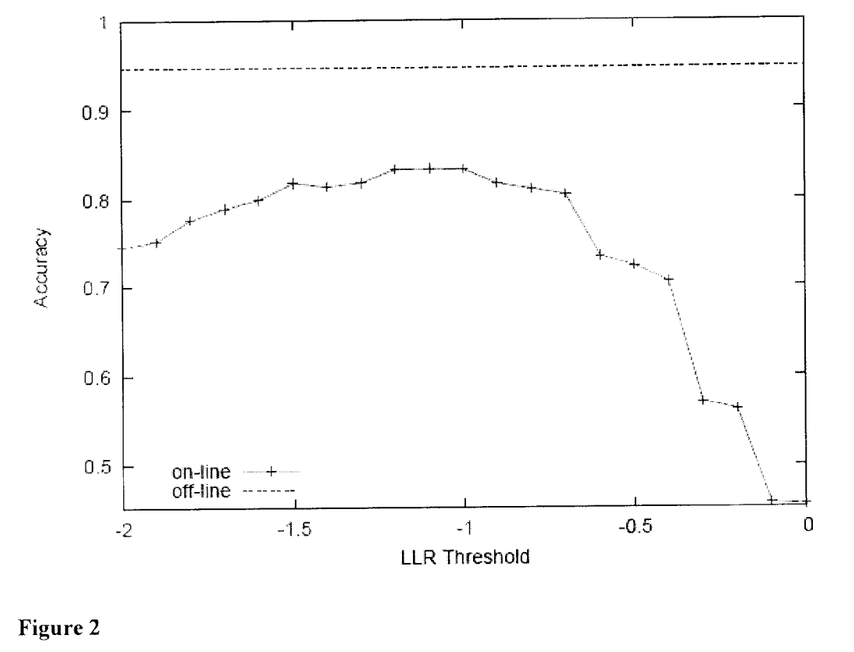
FIG. 2 depicts an experimentally observed relationship between transfer thresholds based on log likelihood ratio and accuracy of transfer for interactions between a caller and an interactive voice response system.

Further variations on the theme of online classification of interactions are also possible. For example, various systems for online classification implemented according to this disclosure could vary from one another based on whether a transfer out of automation is triggered based on static or dynamic factors. To help clarify the nature of this variation, consider that it is possible to use the classified data for testing as well as for training (e.g., by chopping up the records into individual turns, as was described previously in the context of training in a manner similar to online classification). Using this data it is possible to empirically measure the likely behavior of different methods for online classification of interactions as "good" or "bad." For example, given a set of training data with an average log likelihood ratio as shown in FIG. 1, it is possible to test different log likelihood ratios as potential triggers for transfer out of automation, an exemplary set of data which could be obtained from such a test being shown in FIG. 2. Then, to create a static trigger, the test data could be used to determine the log likelihood ratio which results in the greatest accuracy (negative 1.1, in the case of the test data for FIG. 2) which would be set as the threshold for transfer of an interaction into automation. Similarly, to create a dynamic trigger, the test data could be used to determine potential thresholds for transfer of interactions which could later be varied based on external factors (e.g., if a larger number of agents is available, the threshold could be set to transfer more calls, so as to avoid excess capacity, while if a smaller number of agents is available, the threshold could be set to transfer fewer calls, to avoid callers being placed in a hold queue).

Additional variations are possible as well. For example, while a log likelihood ratio measurement based on a language model based classification with a transfer threshold of −1.1 has been found to have an accuracy of 0.830, a precision of 0.831, a recall of 0.834 and an F-score of 0.830, different methods for determining transfer could be used to achieve different results (e.g., a log likelihood ratio using a boostexter classification and transfer threshold of −1.1 has been found to have an accuracy of 0.733, a precision of 0.797, a recall of 0.708, and a F-score of 0.702). Further, while the discussion of model creation above focused on the meanings ascribed to statements by a caller, it is also possible that other features of an interaction (e.g., confidence levels in transcriptions by an automatic speech recognizer) could be used. Additionally, learning might take place, rather than being based on classified data, through the use of unsupervised learning techniques (e.g., outlier detection).

Figure 4:
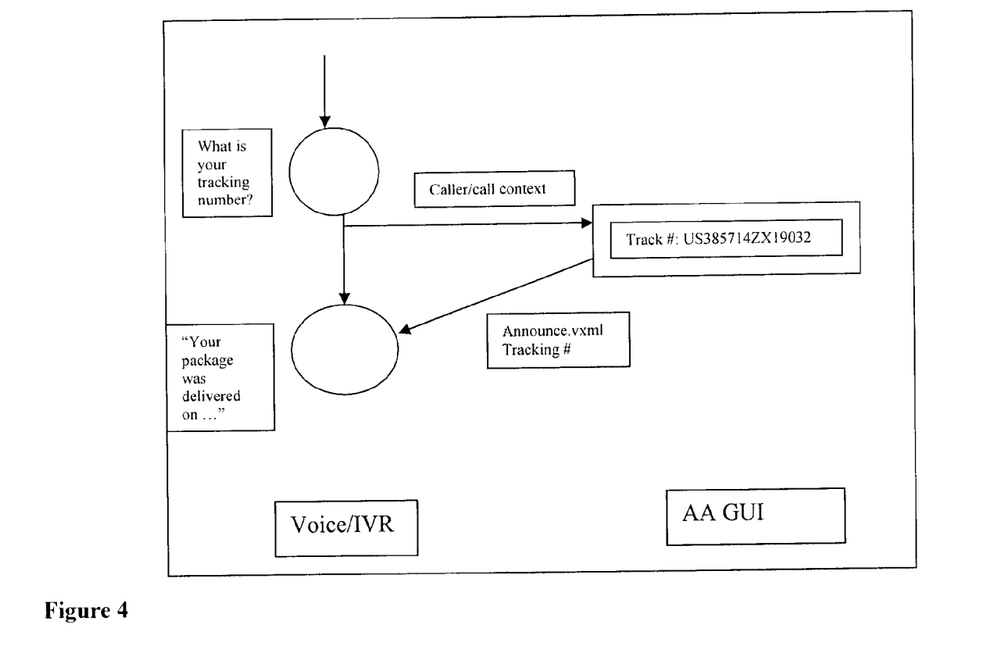
FIG. 4 depicts a flow diagram of an interaction involving a caller, an IVR, and an agent using an assisted automation (AA) GUI.

In addition to, or as an alternative to, the interfaces described above, certain embodiments might comprise a method for measuring the quality of interactions, and/or a method of implementing assisted automation over existing care applications. FIG. 4 depicts the integration of certain products, services, service channels, data sources and agent contexts which might be implemented in some embodiments of the invention.

An IVR might be configured to present a dialog organized into specific states. In some embodiments, those states might be designed so that, at a high level, they correspond to business processes. In some embodiments, either in addition to, or as an alternative to, high level correspondence with business processes, the states might correspond to specific interaction points (such as a single system prompt and a corresponding caller response) at a low level. Further, in some embodiments, states might be defined in terms of the current state and context, the previous state, the next state, and the possible transitions between states. For coordination between an IVR and an assisted automation enabled application, one or more of the states might have an integration definition for a corresponding assisted automation application.

An illustrative example of an interaction between a caller, an agent, and assisted automation enabled application is set forth below:

Assume that the caller speaks the tracking number (say, a 16 character alpha-digit string) and the IVR/speech recognizer has been unable to find a match, and has asked the caller to repeat the tracking number multiple times. In some embodiments, this might trigger intervention by an agent, who might be given access to context information related to the customer's interaction. The agent might then enter the tracking number (which he or she might have heard from the caller's prior recording) into a GUI interface to the IVR, which might then proceed to the next state in the voice dialog. The agent might be given a choice to provide input (tracking #) in a surreptitious mode (without the caller's knowledge) or in a direct mode. In some embodiments, the agent might be instructed to directly interact with a caller if the caller has repeatedly been unable to reach a desired state using the IVR. In some embodiments, after the agent has provided the correct tracking number, the agent might have the option of placing the interaction back into automation, which might free the agent to process one or more additional transactions.

Further variations could also be practiced by those of ordinary skill in the art without undue experimentation. Thus, the disclosure set forth herein should be understood as illustrative only, and not limiting.

We claim:

1. A computerized method for determining when to transfer a user from an automated service to a live agent comprising:
   a) training a set of classification models using a set of classified historical interactions to perform real-time classification of an interaction wherein said classified historical interactions comprise, at least, prompts provided by the interactive voice response system, transcriptions of statements by a caller derived from an automatic speech recognizer, meanings ascribed to statements made by the caller, and confidence scores for the transcriptions; and
   b) during an automated interaction between the user and the automated service, using a computer to calculate a log likelihood ratio, using said classification models, to determine whether to transfer said user, from said automated interaction to a live interaction, by computing a log of a prediction that the interaction is good over a prediction that the interaction is bad;
   wherein:
   1) said log likelihood ratio is computed using the formula $\log(P(x|LM_{good})/P(x|LM_{bad}))$;

2) $LM_{good}$ is a first classification model trained using records of one or more previous interactions classified as good;
3) $LM_{bad}$ is a second classification model trained using records of one or more previous interactions classified as bad; and
4) x is a set of responses made by the user during the interaction.

2. A computerized method as claimed in claim 1 wherein the prediction that the interaction is good and the prediction that the interaction is bad are made without respect to the topic of the interaction.

3. A computerized method as claimed in claim 1 wherein:
a) said log likelihood ratio is compared against a threshold value to determine whether said interaction is bad; and
b) said threshold value may be dynamically reset based on external factors.

4. A computerized method as claimed in claim 3 wherein said threshold value may be dynamically reset based on a lifetime value of a relationship with said user.

5. A computerized method as claimed in claim 4 wherein said classification models are based on a boostexter classification.

6. A computerized method as claimed in claim 5 wherein said boostexter classification is derived using Bayes' rule.

7. A computerized method as claimed in claim 4 wherein said classification models are based on an N-gram language model.

8. A computerized method as claimed in claim 4 wherein said log likelihood ratio is re-calculated for each turn in said automated interaction and wherein said re-calculation takes place after each turn in real time during said automated interaction.

9. A non-transitory computer readable medium storing computer executable instructions to configure a computer to determine when to transfer a user from an automated service to a live agent by performing steps comprising:
a) predicting whether an interaction is good, based on a first classification model trained using records of one or more previous interactions classified as good, using $P(x|LM_{good})$;
b) predicting whether the interaction is bad, based on a second classification model trained using records of one or more previous interactions classified as bad, using $P(x|LM_{bad})$;
c) calculating a log likelihood ratio using $\log(P(x|LM_{good})/P(x|LM_{bad}))$;
d) comparing said log likelihood ratio to a threshold value, such that if said log likelihood ratio falls below said threshold value, instructions are executed to transfer said user from automation to said live agent;
wherein:
i) x is a set of responses made by the user during the interaction; and
ii) the one or more previous interactions classified as good and the one or more previous interactions classified as bad comprise, at least, prompts provided by an interactive voice response system, transcriptions of statements by a caller derived from an automatic speech recognizer, meanings ascribed to statements made by the caller, and confidence scores for the transcriptions.

10. The non-transitory computer readable medium as claimed in claim 9 wherein said classification model is based on a boostexter classification.

11. The non-transitory computer readable medium as claimed in claim 10 wherein said boostexter classification is derived using Bayes' rule.

12. The non-transitory computer readable medium as claimed in claim 9 wherein said classification model is based on an N-gram language model.

13. The non-transitory computer readable medium as claimed in claim 9 wherein said threshold value may be dynamically modified based on external factors.

14. The non-transitory computer readable medium as claimed in claim 13 wherein said threshold value may be dynamically reset based on a lifetime value of a relationship with said user.

15. The non-transitory computer readable medium as claimed in claim 14 wherein said instructions recalculate the log likelihood ratio for each turn in said interaction.

16. A computerized system for determining when to transfer a user from an automated service to a live agent comprising:
a) an interactive voice response system (IVR);
b) a monitoring module;
wherein
i) said user interacts with said IVR;
ii) said monitoring module evaluates, after each turn in said IVR, a probability that said user's interaction with the IVR is good and a probability that said user's interaction with the IVR is bad;
iii) said monitoring module signals an alarm to bring in a human agent if a log of the ratio of said good probability over said bad probability is below a predetermined threshold;
iv) said monitoring module evaluates the probability that the user's interaction with the IVR is good using $P(x|LM_{good})$;
v) the monitoring module evaluates the probability that the user's interaction with the IVR is bad using $P(x|LM_{bad})$;
vi) x is a set of responses made by the user during the interaction;
vii) $LM_{good}$ is a first classification model trained using records of one or more previous interactions classified as good;
viii) $LM_{bad}$ is a second classification model trained using records of one or more previous interactions classified as bad; and
ix) said one or more previous interactions classified as good and said one or more previous interactions classified as bad comprise, at least, prompts provided by the interactive voice response system, transcriptions of statements by a caller derived from an automatic speech recognizer, meanings ascribed to statements made by the caller, and confidence scores for the transcriptions.

17. A computerized system as claimed in claim 16 wherein:
a) $x = r_1, r_2, \ldots r_n$; and
b) each r is a response made by the user in the user's interaction with the IVR.

18. A computerized system as claimed in claim 16 wherein said monitoring module evaluates said probabilities based on a boostexter classifier in an iterative algorithm.

19. A computerized system as claimed in claim 16 wherein said threshold may be dynamically reset based on a lifetime value of a relationship with said user.

* * * * *